United States Patent [19]

Stout

[11] Patent Number: 4,705,284
[45] Date of Patent: Nov. 10, 1987

[54] HUMAN POWERED LAND VEHICLE

[75] Inventor: W. Douglas Stout, Provo, Utah

[73] Assignee: Brigham Young University, Provo, Utah

[21] Appl. No.: 865,168

[22] Filed: May 20, 1986

[51] Int. Cl.⁴ .............................................. B62R 5/08
[52] U.S. Cl. ..................... 280/242 WC; 280/281 LP; 280/282
[58] Field of Search ........... 280/242 WC, 242 R, 245, 280/244, 246, 281 LP, 293, 282

[56] References Cited

U.S. PATENT DOCUMENTS

| | | | |
|---|---|---|---|
| 360,017 | 3/1887 | Hernandez . | |
| 439,922 | 11/1890 | Wood et al. | 280/245 |
| 524,019 | 8/1894 | Desmond . | |
| 638,963 | 12/1899 | Ganswindt . | |
| 688,979 | 12/1901 | Wold | 280/246 |
| 2,940,127 | 8/1960 | Phillips | 280/304 |
| 3,083,036 | 8/1963 | Cornell, III et al. | 280/205 |
| 3,437,351 | 4/1969 | Newbern | 280/205 |
| 3,454,304 | 7/1969 | Hudak | 297/485 |
| 3,746,367 | 7/1973 | Johannsen | 280/293 |
| 4,057,288 | 11/1977 | Schwartz et al. | 297/DIG. 4 |
| 4,198,072 | 4/1980 | Hopkins | 280/267 |
| 4,268,054 | 5/1981 | Twitchell et al. | 297/DIG. 4 |
| 4,279,429 | 7/1981 | Hopkins et al. | 280/267 |
| 4,358,126 | 11/1982 | Mitchell et al. | 280/242 WC |
| 4,373,740 | 2/1983 | Hendrix | 280/282 |
| 4,417,743 | 11/1983 | Garel | 280/266 |
| 4,469,343 | 9/1984 | Weatherford | 280/281 LP |
| 4,469,344 | 9/1984 | Coil | 280/282 |
| 4,523,770 | 6/1985 | Lee | 280/266 |
| 4,524,987 | 6/1985 | Kim | 280/282 |
| 4,526,392 | 7/1985 | Berkstresser | 280/281 LP |

FOREIGN PATENT DOCUMENTS

| | | |
|---|---|---|
| 2001415 | 3/1981 | Fed. Rep. of Germany ....... 5/81 R |
| 2483222 | 12/1981 | France ................................. 414/921 |
| 1595570 | 8/1981 | United Kingdom ......... 297/DIG. 4 |
| 2122557 | 1/1984 | United Kingdom . |
| 2143727 | 2/1985 | United Kingdom ................ 297/485 |

OTHER PUBLICATIONS

"Recreational Mobility's Hand-Bike," Sports 'N Spokes, p. 38 (Jul.-Aug. 1983).
"The Bicycle," Industrial Design Magazine, pp. 36 to 41 (Jul./Aug. 1983).
T. Healey, "Turner To Lead On Hand-Powered Trike," The Indianapolis News, p. 27 (Apr. 1983).
"Outdoors and Free! With a Unicycle," Sports 'N Spokes, p. 33 (Nov.-Dec. 1982).
"Hand Powered Cycle," Sports 'N Spokes, p. 34 (Nov.-Dec. 1982).
Thomas Ferrick, Jr., "A Paraplegic Invents A Stable Handcycle," The Philadelphia Inquirer (Nov. 1982).
D. Singleton, "Iron Man Steels It, Wins 24-Hour Pedal in Park," Daily News (May, 1982).
"Unicycle (1982) Inc.," (1982).

(List continued on next page.)

Primary Examiner—John J. Love
Assistant Examiner—Donn McGiehan
Attorney, Agent, or Firm—Workman, Nydegger & Jensen

[57] ABSTRACT

A human powered wheeled land vehicle is disclosed. The vehicle may utilize two or more wheels, including at least one driving wheel and one steering wheel. The vehicle is propelled by use of at least one lever which is positioned such that the operator is able to grasp the lever and move it back and forth perpendicularly to his body in a reciprocating fashion. A drivetrain mechanism translates the reciprocating motion of the lever into rotational motion of the driving wheel. Two levers may preferably be provided so as to allow the operator to provide alternating motion of the levers. A steering handle is provided on at least one of the levers to control the direction of the steering wheel. The operator may preferably be secured to a seat, the seat also having a back rest, while operating the vehicle. The invention has particular application for use as a racing or touring wheelchair when operated by a paraplegic or a lower-limb amputee.

27 Claims, 7 Drawing Figures

OTHER PUBLICATIONS

D. Grady, "Re-Inventing the Wheelchair," Discover, pp. 82 to 85 (Sep. 1981).
"Orthotics Etcetera," Third Edition, edited by J. B. Redford, M.D., Williams and Wilkins (1980).
V. Papanek, "Design For The Real World, Human Ecology and Social Change," p. 177 (1971).
H. L. Kamenetz, M.D., "The Wheelchair Book-Mobility for the Disabled," Charles C. Thomas Publisher (1969).
Product brochure of Ellefson Engineering, Inc. of Chaska, Minn. (date unknown).
Purchasing instructions of Ellefson Engineering, Inc. (date unknown).
"More about the Rowing Action," (date unknown).
Product brochure of the "Unicycle" (date unknown).
Product brochure of New England Handcycles, Inc. of Brookline, Mass. (date unknown).
"New England Handcycles, Inc.," (date unknown).
"The Trike—Hand-Powered Mobility," magazine article (date unknown).
Product brochure of Landspeeder, Inc. of Westport, Conn. (date unknown).
"Landspeeder" advertisement, Bicycle Magazine (date unknown).
S. Russell, "Inventors Come of Age," Venture Magazine, pp. 42 to 44 (Dec. 1984).
E. J. Stefanides, "Tricycle Gives High Stability, Tight Cornering," Design News (Mar. 1984).
P. Axelson et al., "Mixin' It Up," Sports 'N Spokes, pp. 16 to 17 (Nov.-Dec. 1983).

HUMAN POWERED LAND VEHICLE

I. BACKGROUND

1. The Field of the Invention

The present invention pertains to wheeled land vehicles which are propelled by human power. More particularly, the present invention is directed to a wheeled human powered land vehicle for carrying at least one operator who propels the vehicle by use of his arms and torso moved in a reciprocating back and forth fashion.

2. The Prior Art

Over the past three centuries wheelchairs have been used by individuals whose legs are not capable of functioning normally or are absent. Many of these individuals are otherwise active and healthy members of society. However, due to their nonfunctioning, or absent, legs, they are not able to participate in activities which require locomotion by use of the legs.

However, participating in vigorous physical exercise for these handicapped individuals can be more important than for individuals having full use of their four limbs. Thus, various athletic activities for people confined to a wheelchair have been devised.

Many individuals engage in such "wheelchair sports" for purely recreational pleasure. However, some individuals have organized groups specifically to engage in wheelchair sports on a competitive level. Many of these "wheelchair athletes" are excellent athletes even though they do not have the use of their lower limbs. One of the wheelchair sports which has attracted a great deal of attention, both from handicapped individuals and the general public, is wheelchair racing.

During the past fifteen years, many changes have taken place within the ranks of racing wheelchair athletes. Since 1957, when the National Wheelchair Athletic Association (NWAA) was formed, racing wheelchairs have evolved from being limited to large and heavy models, such as the "standard" models manufactured by Everest and Jennings ® or their equivalents, to the point today when racing wheelchairs are custom fabricated of lightweight materials to meet the particular needs of the wheelchair athlete's body. The design of these racing wheelchairs helps the athlete to better use his available muscle strength and weight. Furthermore, the development of lightweight materials and more efficient designs for wheelchairs has also benefited those who do not participate in wheelchair athletics.

At one time it was thought that racing wheelchairs should all be of the same design so as to avoid giving a particular athlete an advantage because of his wheelchair. However, over the years the decisions of the NWAA have allowed a more flexible approach to the design and construction of racing wheelchairs. This more flexible approach has focused on maximizing an athlete's individual strengths rather than limiting the athlete to the use of a standardized set of equipment. This approach taken by the NWAA has resulted in significant changes, as mentioned earlier, to racing wheelchairs. In turn, these significant changes have resulted in faster, and safer, wheelchairs and correspondingly faster finishing times in all categories of races.

Initially, when wheelchair races were first seriously organized, races generally consisted of 40, 60, and 100 yard dashes. Today, however, wheelchair races now include short, medium, and long distance events, including marathons (26+ miles) which may traverse varying terrain over the open road. Also, many wheelchair athletes do not desire to compete in a race but still desire to independently travel long distances over the open road. Such long distance travel is also referred to as "touring."

Even though the improvement in wheelchair design and materials over the past three decades has greatly improved the performance of wheelchair athletes, even the newest improved chair is basically the same chair that was in use more than 100 years ago. Modern racing wheelchairs are built with lightweight materials, larger wheels, smaller push-rims, lower seats, and high knee posture all of which provide for a more stable and efficient design for the athlete. But the basic design of the modern racing wheelchair is clearly similar to the designs commonly found throughout the past three centuries.

Even with the racing wheelchairs that incorporate all the improvements of the prior art, racing wheelchairs still retain the basic problems of less than optimum muscle use, restricted breathing due to the "crouched" posture of the athlete, and no mechanical system to multiply the rider's strength. Even those designs which have been intended to increase the efficiency of the wheelchair do not lend themselves to use in a racing wheelchair.

For example, one design found in the existing art adapts a conventional four wheel wheelchair by attaching ratcheting levers connected to each wheel along the side of the chair. The rider causes the chair to move forward by grasping the levers and moving the levers back and forth parallel to the circumference of the wheels. Such a design uses the arm and upper body strength of a wheelchair athlete relatively inefficiently and does not provide any advantage over the racing wheelchair designs otherwise available in the art. Thus, wheelchair athletes generally choose wheelchairs which are lightweight modified versions of an ordinary wheelchair.

In summary, while the standard wheelchair serves the ordinary needs of the handicapped adequately, the racing wheelchair athlete often finds that the available adaptations of the conventional wheelchair to his particular needs makes less than optimum use of his athletic ability. Thus, it would be a significant advance in the art of wheelchair design to provide a vehicle with which a paraplegic or lower limb amputee operator could efficiently propel himself using his arms and torso.

It would be a further advance in the art to provide such a vehicle in which the efficiency of the vehicle is maximized so as to make best use of the strength of the operator according to the particular circumstances in which the operator finds himself, that is, racing on a track or on the open road through uneven terrain. A wheeled land vehicle which can be propelled by the motion of the arms and torso of the operator would be welcomed by many wheelchair athletes.

II. BRIEF SUMMARY AND OBJECTS OF THE INVENTION

The present invention is directed to providing a human powered wheeled land vehicle particularly adapted for use by paraplegics and lower limb amputees (both of whom will be generally referred to herein as paraplegics). The present invention provides that the operator is supported by a seat. The seat is provided with an appropriate backrest. The shape of the seat may preferably be adapted so as to allow the operator to be securely held in position according to the particular needs of the operator due to his paraplegia or amputation of the lower limbs. Furthermore, the present invention may be adapted for use by an individual having only one arm or not having full use of both hands.

At least one lever, and generally two levers, are provided where they may be efficiently grasped by the operator of the vehicle. The operator propels himself and the vehicle by moving the levers back and forth in a reciprocating fashion. The levers are disposed such that the position assumed by the operator during propulsion is one which allows optimum use of the strength of the upper body and arms as well as allowing for efficient breathing as is required during aerobic exercise. The operator is positioned, and in some cases secured, in the seat in a position so as to provide the vehicle with a low center of gravity thus providing additional stability.

The vehicle is steered by means of at least one steering wheel generally disposed at the front end of the vehicle. The direction of steering is controlled by at least one steering handle which when moved laterally (side to side) causes the steering wheel to pivot in the corresponding direction. The steering handle, or steering handles, may be mounted on the levers or may be incorporated into the upper section of the levers.

The vehicle is provided with a drivetrain which translates the reciprocating motion of the levers into rotational movement of at least one driving wheel. By use of the lever, drivetrain, and driving wheel, in cooperation with the seat and steering system of the present invention, the resulting human powered land vehicle provides a wheeled vehicle which can be powered by the motion of the arms, or arm, and torso of the operator and which is much more efficient than the wheelchairs found in the prior art.

In view of the foregoing, it is a primary object of the present invention to provide a human powered land vehicle which may be propelled by the movement of the operator's arms, upper body, or torso.

Another object of the present invention is to provide a racing wheelchair which is adaptable for use by paraplegics which is more efficient and more stable than those wheelchairs previously available.

A still further object of the present invention is to provide a human powered land vehicle which may be operated by a paraplegic which takes full advantage of the strength of the arms and torso of the operator.

Yet another object of the present invention is to provide a human powered land vehicle appropriate for use by paraplegics which allows the mechanical advantage provided to the operator, or the ratio of the work output by the operator to the distance travelled by the vehicle, to be varied.

Still another object of the present invention is to provide a human powered wheeled land vehicle suitable for use by paraplegics which provides a steering and braking mechanism which is efficiently and conveniently used by the operator.

These and other objects of the present invention will become more fully apparent by examination of the following description of the preferred embodiments and the accompanying drawings.

IV. DETAILED DESCRIPTION OF THE PREFERRED EMBODIMENTS

Figure 1:
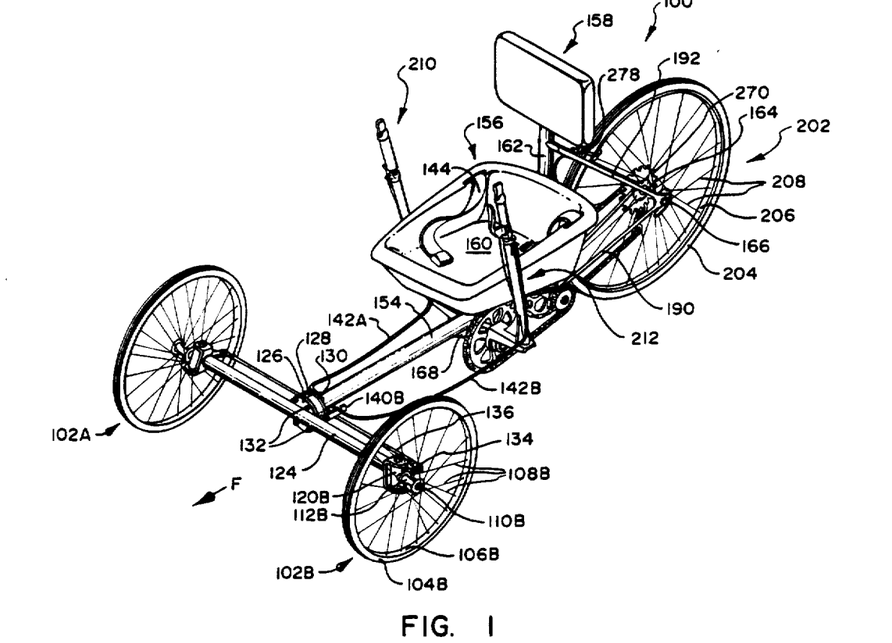
FIG. 1 is a perspective view of one presently preferred embodiment of the present invention.

One presently preferred embodiment of the present invention is generally designated 100 in the perspective view of FIG. 1. The vehicle of the present invention 100 is generally termed a human powered wheeled land vehicle. The present invention is principally concerned with providing a more efficient design of a vehicle to be used as a racing or touring vehicle for individuals afflicted with paraplegia, or those who have lost their lower limbs. Moreover, it will be appreciated that the vehicle of the present invention could be used by those who have the use of their lower limbs both as a recreational and athletic item or as practical transportation.

However, the particular features of the embodiments of the present invention, which will be described shortly, are particularly adapted for meeting the needs of a wheelchair athlete who is involved in racing or touring events, including both short distance events and marathon and longer distances. Thus, the following description will assume that the present invention is to be used primarily as a racing or touring wheelchair.

A. The Frame of the Present Invention

The frame of the present vehicle can take many different configurations. One presently preferred embodiment 100 of the present invention has a frame configured as illustrated in FIG. 1. The principal components of the frame of the embodiment illustrated in FIG. 1 are main tube 154 (the large main tube running horizontally from front to rear), steering axle 124, seat tube 162, chain stay 190, and seat stay 192.

Also, as shown best in FIG. 2, lever bottom bracket 274 is suspended below main tube 154 by tubular struts 168 and 170. Driving bottom bracket 272 is also suspended below main tube 154 by tubular strut 172 and seat tube 162. Those who are familiar with the art of designing and fabricating bicycle frames will be familiar with the terminology used to describe many of the frame components.

The use of the term "tube" is not intended to limit the configuration of the materials used to construct the frame of the present invention. However, a tubular member generally provides the greatest strength to weight ratio for the configurations of frames considered herein. Furthermore, tubes fabricated from suitable materials are generally available from a variety of commercial sources. Some of the materials which potentially may be used in the frame of the present invention will be mentioned shortly.

The frame of vehicle 100 illustrated in FIG. 1 is intended to support an operator and the structures associated with the propulsion and steering systems of vehicle 100. The frame of the embodiment 100 illustrated in FIG. 1 is supported off the ground by two steering wheels 102A and 102B disposed at the forward end of the vehicle and one driving wheel 202 disposed at the rear end of the frame.

When describing the various structures of the preferred embodiments of the present invention, many times various structures will be identically, or similarly fabricated. For example, in the embodiment 100 illustrated in FIG. 1, steering wheels 102A and 102B may be identically configured. When components of the illustrated embodiments share such similar structures, such structures will generally be similarly numbered and accompanied by different letter suffixes, such as is the case with steering wheels 102A and 102B.

It will be appreciated that since the primary intended use of the present invention is as a racing or touring wheelchair that provision for only one individual, the operator, to ride upon the vehicle is provided. However, embodiments allowing the addition of a passenger and/or cargo area are contemplated within the present invention. Furthermore, in the illustrated embodiment 100 three wheels (one driving wheel 202 and two steering wheels 102A and 102B) provide the most stable configuration for a racing or touring wheelchair. Use of this stable three wheel configuration allows a paraplegic to operate the vehicle without any previous training.

Figure 6:
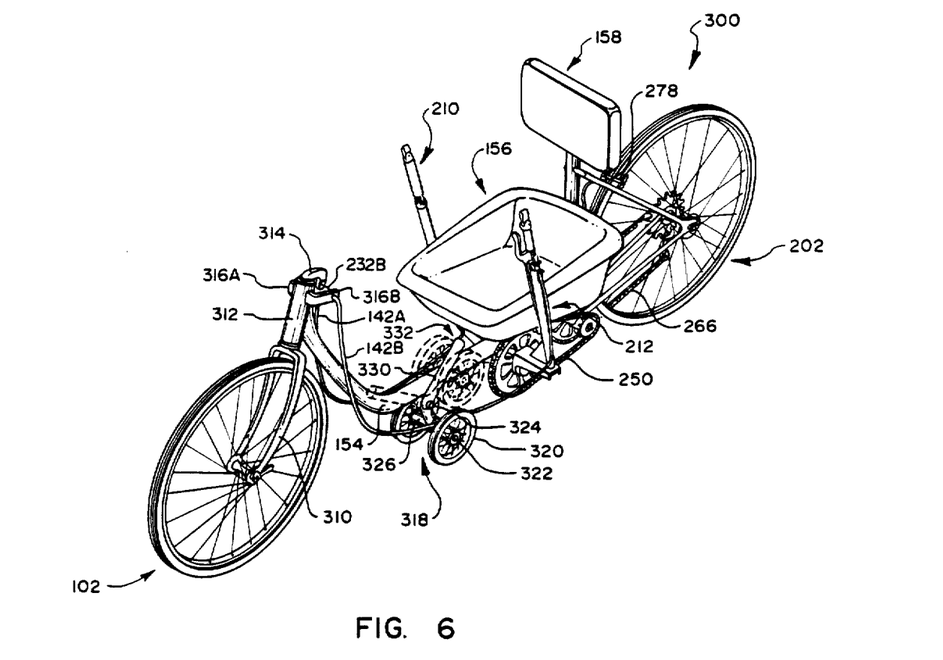
FIG. 6 is a perspective view of another presently preferred embodiment of the present invention.

Thus, while the illustrated three wheel embodiment is most suitable for use in the present invention as a racing or touring vehicle, other applications may call for other configurations, such as four wheels (two driving wheels and two steering wheels) or alternative three wheel embodiments (two driving wheels and one steering wheel). An embodiment having only one driving wheel and one steering wheel is shown in FIG. 6.

Embodiments capable of carrying two individuals, either two operators, or an operator and a passenger, may be devised. An embodiment having two operators could share the advantages of a tandem bicycle, that is, allowing two individuals to exert effort to propel the vehicle. It will be appreciated that those skilled in the art would be able to design and fabricate frames suitable for such additional embodiments.

The materials and the methods used to construct the frame of the vehicle of the present invention are well known to those familiar in such arts as bicycle frame fabrication. However, since both strength, weight, and rigidity of the frame are paramount considerations, those who are skilled in the design and fabrication of bicycle frames are particularly well versed in the materials and methods advantageous for use in the present invention.

As just mentioned, it is important that the frame be lightweight so as to require a minimum amount of effort to accelerate the vehicle. Further, the frame must be strong enough so as to withstand the stresses placed upon it during operation. Yet another consideration is the rigidity of the frame. While a frame may be strong enough to withstand the expected stresses without permanent deformation, if the frame flexes excessively, then an undue amount of effort of the operator is absorbed by the frame rather than used for propelling the vehicle. Alternatively, a frame which is too "stiff" may create an uncomfortable ride for the operator. The proper combination of weight, strength, and rigidity can be determine according to the particular application, and the particular operator, for which the vehicle is designed.

The materials from which the frame of the present invention may be fabrication include many materials commonly used for fabrication of bicycle frames. These materials include low carbon steel alloys or sophisticated high strength steel alloys, titanium and aluminum alloys as well as graphite fibers and other materials which may be found to have suitable characteristics. Generally, as mentioned earlier, such materials are used in the form of tubes which are joined by a method suitable for the particular material.

Such tubes may be butted, that is the interior diameter varies along the length of the tube, in order to reduce the weight of the tube and improve the characteristics of the tube. The particular geometry of the frame may be varied according to the particular needs of the application. For example, a vehicle to be used on a track may require very little clearance from the ground to the lowest point of the vehicle. Alternatively, a vehicle to be used on the open road may require more ground clearance. Also, a greater strength to weight ratio may be obtained using a more complex frame design than that shown in FIG. 1, such as a cantilever or truss design. Furthermore, if the operator is extremely heavy, or passengers or heavy cargo are to be carried, additional support members may be necessary in order to provide a frame of sufficient strength.

B. The Seat of the Present Invention

When the vehicle of the present invention is used as a racing or touring wheelchair, generally only one individual, the operator, will be riding. The seat used to support the operator is particularly important in the present invention.

Because the operators of the present invention will generally be paraplegics, or lower limb amputees, the seat must provide proper support to hold the individual in the correct operating position. As illustrated in FIG. 1, one presently preferred seat, generally designated 156, takes the form of a bucket seat. The pelvis of the operator (not shown) should fit snugly within the bucket 160 of seat 156. Seat 156 should be designed so as to provide maximum comfort while efficiently holding the operator in the proper position. Further, the seat should be designed so as to keep its weight to a minimum and also reduce its air drag as much as possible.

It will be realized that individuals that have lost their lower limbs may require a different seat design that those who have merely lost the use of those limbs. However, the basic bucket seat design seems suitable for both types of individuals with some modifications for each. However, some individuals may express a preference for a "sling" type seat. In such a seat a flexible material is stretched between two rods along the outer edges of the material, such as is found in many conventional wheelchairs.

Since the operator of the vehicle is in many cases able to use his torso muscles, as well as the muscles in his arms, to propel the vehicle, a backrest 158 and harness 144 may also be provided. A suitable backrest, generally designated 158 in FIG. 1, greatly assists the operator when exerting a pushing action with his arms. The backrest should be designed so as to be both comfortable and so as to not increase the aerodynamic drag of the vehicle.

A harness 144 may also be provided. The harness may consist of a single strap which fits around the waist of the operator or a more complex shoulder, chest, or waist harness. By appropriately configuring a harness, the force that the operator is able to exert when pulling is increased, if the particular embodiment provides a power stroke both pushing and pulling.

It should be appreciated that the needs of particular paraplegics vary greatly from individual to individual. For example, seat 156, backrest 158, and harness 144 of the present invention may advantageously be designed differently for an individual having his lower limbs amputated at the knee as opposed to an individual who is paralyzed from the waist down. In the case of the "at the knee" amputee, the operator may be able to use the remaining muscle structure below the waist so as to efficiently propel himself using the vehicle of the present invention. While in the case of the "below the waist" paraplegic, such an operator may need to rely solely on the strength of his arms and upper torso.

In view of the above considerations, it should be appreciated that it may become necessary to orient seat 156 and backrest 158 such that the operator is not exactly upright, but may be leaning at a substantial angle in order to obtain maximum use of available strength. When such nonvertical seating orientations are incorporated in the present invention, it may be necessary to include an elaborate harness system or a chest support (not shown) against which the operator may lean.

C. The Drivetrain of the Present Invention

Figure 2:
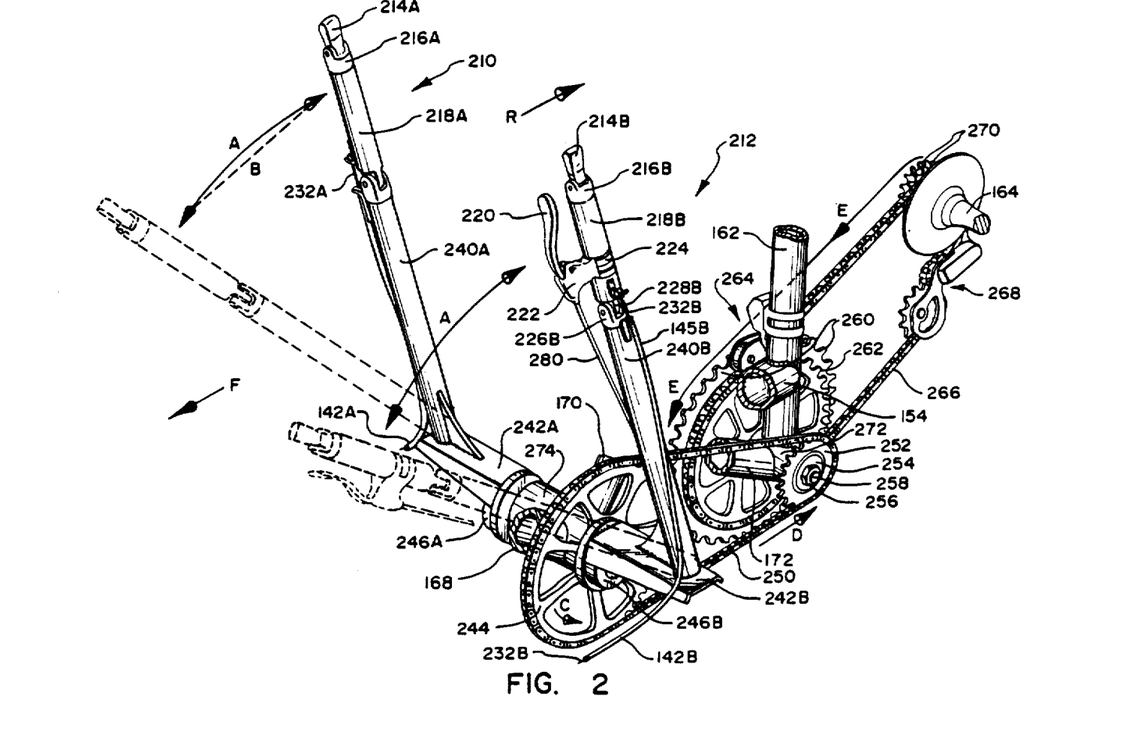
FIG. 2 is a perspective view showing in detail the major components of the propulsion system of the embodiment illustrated in FIG. 1.

The drivetrain of the embodiment 100 illustrated in FIG. 1 is shown in greater detail in the perspective view of FIG. 2. As explained earlier, the vehicle is propelled by the operator moving at least one lever back and forth in the reciprocating motion. The embodiment illustrated in FIGS. 1-2 uses two independent levers 210 and 212. The drivetrain of the vehicle translates the reciprocating motion of the levers into unidirectional rotational movement of the driving wheel 202 in FIG. 1, or multiple driving wheels.

The drivetrain may function as a means for varying the mechanical advantage that is provided to the operator. When using the term "mechanical advantage" it is generally meant to refer to the ratio between the distance that the levers travel and the distance travelled by the driving wheel 202, or multiple driving wheels. The particular structure used to accomplish this will be described in detail below.

As can be seen in FIG. 2, levers 210 and 212, extend from a lever bottom bracket 274 upward towards the seated position of the operator. The lower, or proximal, section 240A and 240B of levers 210 and 212, respectively, in the embodiment illustrated in FIG. 2, are each pivoted about a common axis (not indicated in FIG. 2) through lever bottom bracket 274. In the illustrated embodiment, the lower, or proximal section 240A and 240B of each lever 210 and 212 is rigidly connected to lever freewheels 246A and 246B, respectively, by members 242A and 242B. It will be appreciated that lower lever sections 240A and 240B could be formed so as to directly connect to lever freewheels 246A and 246B.

Lever freewheels 246A and 246B allow levers 210 and 212 to ratchet in a reverse direction, indicated by arrow R, not causing any motion of lever chainwheel 244. However, when levers 210 or 212 are pushed in the direction of arrow F, lever chainwheel 244 is caused to rotate in the direction of arrow C. This is accomplished by rigidly connecting lever chainwheel 244 to lever axle (not shown in FIG. 2, but which runs laterally through lever bottom bracket 274 and which rotates on an appropriate bearing structure) while attaching levers 210 and 212 to lever axle by use of lever freewheels 246A and 246B. Lever freewheels may be custom fabricated or may be modified freewheel bodies which are customarily used on bicycles. Such freewheel bodies can be obtained from a variety of manufacturers and modified for use with the present invention.

When the term "freewheel" is used herein, it is to be given a meaning similar to that attributed to the term in the art of bicycle design and fabrication. This is, a device which allows free rotation in one direction, but yet does not allow rotation in the opposite direction is generally termed a "freewheel".

By properly orienting freewheels 246A and 246B rotation of lever chainwheel 244 is only accomplished when levers 210 and 212 are moved in the direction marked by the arrow F. Furthermore, lever chainwheel 244 rotates only in the direction marked C. It should be appreciated that structures other than the illustrated freewheel, chainwheel, cog, and chain components could be used in the present invention. For example, a propulsion system can be implemented using a driveshaft rather than a chain. However, the illustrated system provides an excellent balance between weight, strength and efficiency.

It will be appreciated that the present invention may be structured so that levers 210 and 212 can only be pulled synchronously such that they reciprocate in unison. However, it has been found to be most advantageous to allow independent movement of levers 210 and 212 using the arrangement just described. Independent movement of levers allows the operator to choose to reciprocate levers in an alternating mode or synchronously. Moving levers 210 and 212 in an alternating mode of operation provides that, when the embodiment only delivers power to the driving wheel 202 during the push stroke (in the direction of arrow F) smoother and more consistent power delivery can take place than if levers must be moved synchronously.

Chain 250 connects lever chainwheel 244 to intermediate cog 252. Intermediate cog 252 is rigidly attached to driving axle 258 by way of nut 256 and washer 254. Driving axle 258 extends through driving bottom bracket 272. Driving axle 258 rotates within bottom bracket 272 upon a bearing structure commonly used in the art of bicycle design. Thus, as lever chainwheel 244 rotates in the direction indicated by arrow C, chain 250 travels in the direction indicated by arrow D, causing intermediate cog 252 to rotate in the same direction.

Driving chainwheels, outer chainwheel 260 and inner chainwheel 262, are fixed to driving axle 258. Chainwheels 260 and 262, as will be recognized in connection with many other components of the present invention, may be modified from components which are commonly available in the art from various commercial suppliers. Since both driving chainwheels 260 and 262 are fixed to driving axle 258, driving chainwheels 260 and 262 rotate in the direction marked by arrow E when intermediate cog 252 is rotated in the direction of arrow D.

As an alternative to relying on commercially available parts, custom-designed components may be designed and fabricated. Since weight and strength are particularly important considerations in the present invention, it may be advantageous to use high strength, lightweight materials, whether available as commercially fabricated components, or custom-made components, both of which may be made using materials such as aluminum and titanium alloys. Those who are familiar with the design and fabrication of high performance bicycles will be aware of components, as well as fabrication techniques and materials, which may have application in the present invention.

In particular, rather than using commercially available components for lever freewheels 246A and 246B, a bidirectional transmission (not shown in the drawings) may be designed and used in the present invention. Such a bidirectional transmission wheel would translate the motion of levers 210 and 212 in both the forward and backward directions into a unidirectional movement of driving chainwheels 260 and 262. Such a bidirectional transmission could be designed by one skilled in the mechanical arts. Such a bidirectional transmission would allow power to be applied to driving wheel 202 when the operator is both pushing and pulling levers 210 and 212.

Driving chainwheels 260 or 262 are connected to driving wheel freewheel 270 by chain 266 as shown in FIG. 2. Driving wheel 202 can be a conventional bicycle wheel. In the embodiments illustrated, such as in FIG. 1, drive wheel 202 is a 27 inch wheel having a tire 204, inner tube (not shown), rim 206, spokes 208, and hub 164. The particular design of driving wheel 202 may be altered to suit the needs of a particular application. The drive wheel is provided with drive freewheel 270. Freewheel 270 is connected by chain 266 to driving chainwheel 260 or 262.

Freewheel 270 is of the type generally available in the art. In the illustrated embodiment, freewheel 270 includes 5 cogs and a freewheel body (which is hidden within the cogs and not shown in the figure) which allows freewheel 270 to "ratchet" when the vehicle is coasting in a forward direction, but to apply power to driving wheel 202 when a power stroke is applied on levers 210 or 212.

In summary, as indicated in FIG. 2, when levers 210 or 212 are pushed forward by the operator, lever freewheels 246A and 246B will cause lever axle (now shown) to rotate in the direction of arrow C, thus causing lever chainwheel 244 to rotate in the same direction. The rotation of lever chainwheel 244 in the direction of arrow C will cause the rotation of intermediate cog 252 in the direction of arrow D, thus causing the driving chainwheels 260 and 262 to also rotate in the direction of arrow E. The vehicle is propelled by the rotation of driving chainwheels 260 or 262 which is transmitted to driving freewheel 270 and driving wheel 202 by chain 266.

In FIG. 2, the levers 210 and 212 are shown in a first position and a second position as indicated by the solid and outline images. Moving levers 210 and 212 along the path indicated by arrow A causes the propulsion of the vehicle along a forward path.

The orientation of the operator and the location in which he grasps levers 210 and 212 is important in order to achieve maximum efficiency. Generally, the lever axle (not shown) to which lever freewheels 246A and 246B and lever chainwheel 244 are attached, should be positioned approximately 4 to 6 inches forward of the shoulders of the operator. Further, the height of levers 210 and 212 should be such that the chord, marked B, of the arc, marked A, in FIG. 2, which is formed by the portion of levers 210 and 212 which are grasped by the operator should be approximately perpendicular to the shoulders of the operator. Also, for some operators it may be advantageous to interconnect levers 210 and 212 by a lateral bar (not shown in the drawings) oriented so as to give the operator an additional location to reciprocate levers 210 and 212.

It will be appreciated that such an orientation may necessarily be altered according to the particular needs of the individual. For example, an "above the knee" amputee may be able to make efficient use of levers which are shorter since such an individual is able to bend at the waist and use upper leg and abdominal muscles whereas such muscles are not available to an operator who is paralyzed below the waist. In contrast, a "below the waist" paraplegic may not be able to bend at the waist, so "full length" levers 210 and 212 may be required.

As mentioned earlier, the drivetrain of the present invention may preferably be used to vary the mechanical advantage provided to the operator. By providing more than one driving chainwheel as shown at 260 and 262 in FIG. 2, and/or additional freewheel cogs 270, and an appropriate derailleur system, which may include front derailleurs 264 and rear derailleur 268, as shown in FIG. 2, the gearing provided to the operator may be widely varied. This provides a significant advantage to the operator to assist him to propel himself over widely varying terrain as might be expected on a marathon or when touring.

Furthermore, when climbing steep inclines, the alternating reciprocating movement of levers 210 and 212 provides that relatively constant power may be applied such that the vehicle will not have an opportunity to travel backwards down the incline during a non-power stroke. By providing a proper gear ratio, a wheelchair athlete can easily operate the levers 210 and 212 in the alternating mode while ascending a steep incline.

Furthermore, operating levers 210 and 212 in an alternating (i.e., nonsynchronous) fashion allows for continuous rotation of driving chainwheels 260 and 262 and freewheel cogs 270 which is necessary for proper operation of either front derailleur 264 or rear derailleur 268. Derailleurs appropriate for use in the present invention are commercially available and are very familiar to those well-versed in the art bicycle design. Still further, it will be appreciated that the use of the bidirectional transmission, discussed earlier, allows similar advantages to operating the levers in an alternating fashion.

The shift controls 214A and 214B for front derailleur 264 and rear derailleur 268, respectively, are preferably mounted in a convenient position, such as the position shown on levers 210 and 212. Furthermore, a commercially available caliper brake 278, as shown in FIG. 1, may be readily incorporated into the present invention so as to provide a brake for driving wheel 202. The brake control 220 is also preferably conveniently mounted on lever 212, as shown in FIG. 2. As will be appreciated by those skilled in the art, caliper brakes, such as the type illustrated in FIGS. 1 and 2 may be used or alternative types of brakes, such as cantilever brakes or disk brakes may also be used on driving wheel 202 or other wheels of the present invention if additional braking capacity is desired.

It should be appreciated that the propulsion system of the present invention may take many forms other than those illustrated and described herein. However, the propulsion systems described herein, whether using commercially available or "custom fabricated" components provide an excellent balance between weight, strength, efficiency, and durability.

D. The Steering System of the Present Invention

Figure 3:
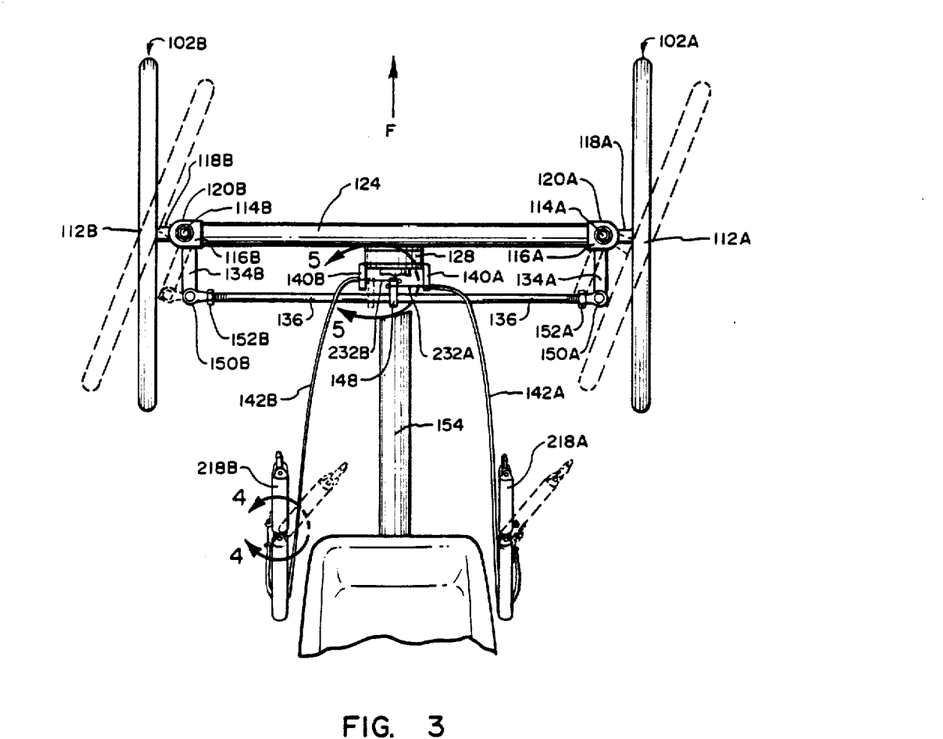
FIG. 3 is a plan view of the steering mechanism of the present invention.
Figure 4:
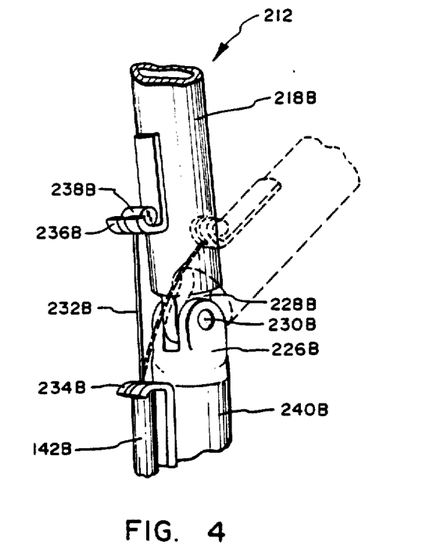
FIG. 4 is an elevated view showing the structure of the steering handles taken along line 4—4 of FIG. 3.
Figure 5:
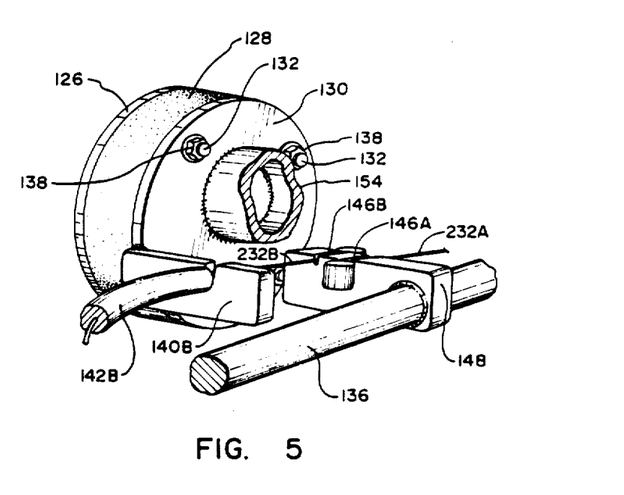
FIG. 5 is a perspective view showing portions of the steering system taken along line 5—5 of FIG. 3.

The steering system of the embodiment illustrated in FIG. 1 can be seen best in the detailed view of FIGS. 3–5. The paraplegic operator must be able to steer the vehicle using his hands or arms which are also being used to propel the vehicle. Furthermore, various other control functions, such as gear shifting and braking must be carried out by the hands. Thus, the mechanism used to direct the steering of the vehicle of the preferred embodiments is conveniently placed on levers 210 or 212. Furthermore, the steering controls used by the operator are appropriately configured as handles, referred to herein as steering handles 218A and 218B.

In the embodiment illustrated in FIGS. 1–7, the steering handles 218A and 218B are fabricated as an integral part of levers 210 and 212. Thus, steering handles 218A and 218B may be pushed and pulled upon longitudinally (along the front to rrear axis of the vehicle) to propel the vehicle and also may be laterally moved, i.e., to the operator's left or right, to steer the vehicle in the corresponding direction.

Thus, by combining the functions of the steering handles 218A and 218B into levers 210 and 212, as well as placing other controls on levers 210 and 212 or steering handles 218A or 218B, the operator is able to control all functions of the vehicle with his hands. Furthermore, it will be appreciated that if an operator does not have fully functioning hands, but useful arms, orthopedic appliances could be designed by those skilled in that art to allow an operator to control the functions of the vehicle.

The structure which allows lateral movement of steering handles 218A and 218B is best shown in FIG. 4 using steering handle 218B as an example. The lower (proximal) end of steering handle 218B is provided with a protrusion 228 through which a hinge pin 230 is inserted. Similarly, lower level section 240B is provided with a corresponding double protrusion structure 226 so as to form a hinge. The hinge arrangement allows steering handle 218B to be laterally moved while not allowing longitudinal movement except in conjunction with the longitudinal movement of lever 212.

Steering handle 218B is also provided with a cable grip 236B which receives steering cable head 238B. Also, lower lever section 240B is provided with a cable stop 234B. Cable 232A and 232B, and cable housing 142A and 142B may be cable and cable housing which are commercially available. As steering handle 218B is tilted as indicated by the outline image of FIG. 4, cable 232B is pulled within cable housing 142B.

The effect of tilting steering handles 218A or 218B can be seen best in the plan view of FIG. 3. When steering handles 218A and 218B are tilted as shown by the outline image in FIG. 3, steering wheels 102A and 102B are turned as shown by the outline images in FIG. 3. As will be appreciated by an examination of FIG. 3, by tilting steering handle 218B, as shown in FIG. 3, steering cable 232B causes tie rod 136 to move. The structure responsible for this action can be seen best in the perspective view of FIG. 5.

FIG. 5 shows tie rod 136 with its associated tie rod plate 148. Steering cables 232A and 232B are placed in slots 146A and 146B provided in tie rod plate 148. Each cable housing 142A and 142B is held in its proper place by a cable stop, only one of which is shown at 140B in FIG. 5, and both of which are shown in FIG. 3 at 140A and 140B.

As shown in FIG. 3, tie rod 136 is pivotally connected to arms 134A and 134B by members 150A and 150B, respectively. The toe in (or toe out) of steering wheels 102A and 102B may be adjusted by adjusting nuts 152A and 152B.

In the embodiment shown in FIG. 3, arms 134A and 134B are each connected to their respective kingpin cylinders 120A and 120B, which are shown best in the perspective view of FIG. 1. Also, as shown in FIG. 3, kingpin brackets 116A and 116B provide support for kingpins 114A and 114B. Kingpins 114A and 114B are secured to their corresponding kingpin cylinders 120A and 120B by nuts. Kingpins 114A and 114B may be provided with bearings structures to support kingpin cylinders 120A and 120B. The axles 118A and 118B (shown in FIG. 3) for steering wheel hubs 112A and 112B (shown best in FIG. 1) are attached directly to kingpin cylinders 120A and 120B.

By use of the kingpin arrangement just described, and tie rod 136, the steering system of the illustrated embodiment may be adjusted so as to have the desired toe in (or toe out), caster, camber, and track. By adjusting these parameters properly, a more stable and easily controlled steering mechanism may be incorporated in the vehicle of the present invention. Those familiar with the design of steering systems will appreciate other designs which could be incorporated in the embodiments of the present invention.

As best indicated in FIG. 5, in order to provide for some flexing, and shock absorption, between the steering axle 124 and main tube 154, a resilient material 128 is interposed between steering axle mounting plate 126 and main tube mounting plate 130. Resilient material 128 is held in place by bolts 132, as shown in FIGS. 1 and 5. Bolts 132 are embedded into resilient material 128, but not so far as to make contact with the opposing mounting plate 126 or 130. The shafts of bolts 132 are then inserted through holes in the mounting plate 126 or 130 and held in place by nuts 138. By interposing resilient material 128 between steering axle 124 and main tube 154, main tube 154 is allowed to tilt laterally somewhat when negotiating a turn at high speeds while steering wheels 102A and 102B are allowed to remain firmly on the road. Furthermore, such an arrangement allows some shock absorption by resilient material 128. Resilient material 128 may be any material having suitable characteristics, such as a dense rubber material.

It will be appreciated that many different designs, other than that just described, can be incorporated into the steering system of the vehicle of the present invention. One potentially advantageous modification is to provide a steering system which only requires one steering handle to direct the steering wheels in both directions. Alternatively, two steering handles could be retained thus giving the operator the choice of which arm and hand to use for steering (which might advantageously be chosen as the operator's weaker arm).

As will be appreciated, the embodiment illustrated in FIGS. 1–5 provides an efficient human powered land vehicle especially suitable for use by paraplegics. The structures described above are merely representative of the present invention. The illustrated embodiments have the advantage of using many commercially available components thus reducing the cost of the embodiment. However, if the highest performance possible from an embodiment is desired, many, if not all, of the components could be custom designed and manufactured for a particular operator so as to obtain maximum efficiency.

E. The Two Wheeled Embodiment of the Present Invention

FIG. 6 illustrates a two wheeled embodiment 300 of the present invention. The two wheeled embodiment 300 includes one steering wheel 102 and one driving wheel 202. The driving wheel 202, seat 156, backrest 158, and the propulsion system (including levers 210 and 212 and the associated freewheels, chainwheels, and chains and cogs) are essentially identical to those previously described.

In the two wheel embodiment 300 illustrated in FIG. 6, the steering wheel 102 may preferably be a standard bicycle wheel, such as would normally be found as a front wheel on a bicycle. Furthermore, steering fork 310 may be a fork which is commercially available from bicycle manufacturers. Likewise, head tube 312 may similarly be that ordinarily found on a bicycle which also includes a head set (not indicated in FIG. 6). A headset provides a bearing structure which interfaces between fork 310 and head tube 312. Main tube 154 is bent upward so as to be properly connected with head tube 312.

Steering cables, such as 232B, are connected to steering plate 314. Steering cable stops 316A and 316B perform the same functions as steering cable stops 140A and 140B, as shown in FIG. 3. It will be appreciated that the steering and propulsion systems of the embodiment illustrated in FIG. 6 perform substantially in the same manner as those illustrated in connection with the previously described embodiments.

However, it will be appreciated that the two wheel embodiment will not remain upright unless travelling at an appropriate speed. Thus, since a paraplegic operator does not have a convenient means for holding the vehicle upright until the correct speed is reached, retractable lateral support wheels, generally designated 318, are included in the two wheel embodiment. Lateral support wheels 318 comprise two small diameter wheels 320 mounted on a common axle 322. The lateral support wheel axle 326 is connected to a pivoting arm which pivots about the bolt marked 324 in FIG. 6.

When retractable lateral support wheels 318 are in the position shown by the solid image in FIG. 6, the wheels are approximatly 1 inch from the ground surface when the vehicle is perpendicular to the ground. Thus, vehicle 300 is held substantially upright until such time as the operator is able to propel the vehicle at the proper speed. Various latch or stop structures (not shown) may be incorporated into the illustrated embodiment to hold lateral support wheels 318 in the proper position.

When the proper speed is attained, the operator may retract lateral support wheels 318 by pushing pivoting arm upper end generally designated 332, towards the front of the vehicle. Thus, retractable lateral support wheels 318 will assume the position indicated by the outline image in FIG. 6. Thus, retractable lateral support wheels will be retracted up out of the way. If the operator desires to stop, the lateral support wheels 318 may be extended to the down position.

The two wheel embodiment provides the advantage of being more responsive to the control of the operator as would be the case with a bicycle. Furthermore, since only two wheels are contacting the ground, the rolling friction is reduced over that obtained with a three wheel embodiment. However, as will be appreciated, the two wheel embodiment requires substantially more skill of the operator than the three wheel embodiment. The advantages to be gained by the two wheel embodiment may be sufficient so as to justify the additional skill required of the operator.

F. The Two Driving Wheel Embodiment of the Present Invention

Figure 7:
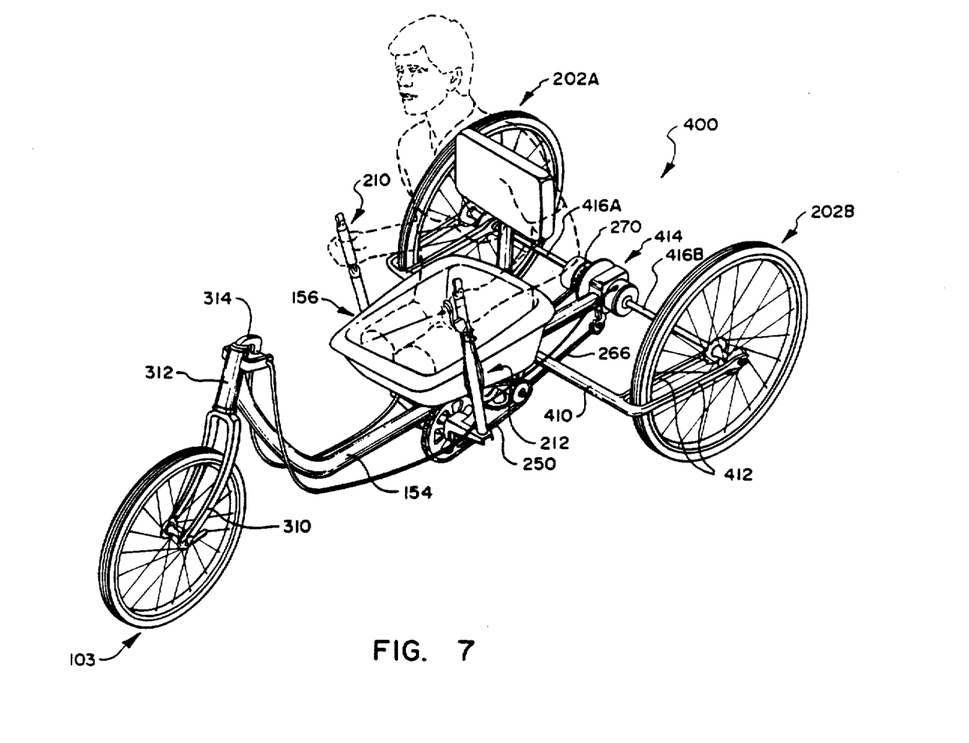
FIG. 7 is a perspective view of yet another presently preferred embodiment of the present invention.

The two driving wheel embodiment 400 illustrated in FIG. 7 incorporates two driving wheels 202A and 202B, and one steering wheel 103. The steering mechanism of the embodiment illustrated in FIG. 7 is the same as that illustrated in FIG. 6, with the exception that steering wheel 103 is of a smaller diameter that steering wheel 102 illustrated in FIG. 6. Furthermore, most of the propulsion system of FIG. 7 is identical to the propulsion systems illustrated in the previously described embodiments. However, the frame of the embodiment includes additional lateral frame members 410 and 412. These additional frame members serve to hold driving wheels 202A and 202B in the proper spaced relationship. Driving wheels 202A and 202B may be similar to the driving wheels 202 illustrated in connection with the previously described embodiments without the customary freewheels attached. Suitable structures to attach drive shafts 416A and 416B to driving wheels 202A and 202B are known in the art. Also shown in FIG. 7 is an outline of an operator in position to propel the vehicle 400.

The propulsion system of the embodiment illustrated in FIG. 7 differs in that the freewheel 270, rather than being directly connected to driving wheels 202A and 202B, as is the case in the previously described embodiments, drives a differential mechanism generally designated 414 in FIG. 7. Differential mechanism, generally designated 414, which is supported in place by main tube 154 properly distributes power to driving wheels 202A and 202B. The operation of the remainder of the propulsion system of the two driving wheel embodiment 400 is identical to that of the previously described embodiments.

The two driving wheel embodiment 400 provides the advantage of a vehicle which is very stable and which is capable of carrying heavier loads. For example, a cargo area (not shown) could be added behind the operator's seat. Alternatively, a rack for holding a conventional folding wheelchair could be included. Thus, a paraplegic could use the embodiment 400 for travel on the open road until he reached his destination and then transfer to a conventional wheelchair for mobility indoors or short distances outdoors. Furthermore, a passenger seat or seats, could easily be added to the embodiment 400.

V. SUMMARY

It will be appreciated that the vehicle of the present invention provides a much more efficient method of transportation for a paraplegic than previously available wheelchairs. However, the present invention is not limited to use as a wheelchair. For example, the present invention may be adapted so as to allow the operator to leave on extended tours, such as are commonly performed by individuals on bicycles. The embodiments of the present invention may be particularly adapted for racing, touring, or as a practical vehicle for carrying cargo or additional passengers.

When used by a wheelchair athlete, the present invention allows much more efficient use of available muscle strength while the orientation assumed by the operator allows for more efficient breathing, rather than the often cramped posture that is necessary in a conventional wheelchair. Furthermore, the present invention may be inexpensively fabricated from commercially available components or may be custom manufactured so as to maximize its efficiency. Also, all of the controls required for the present invention may be conveniently operated by the operator.

Still, further embodiments of the present invention may be adapted for use by individuals with only one arm or without full use of both hands. Embodiments of the present invention provide a very stable vehicle which can be operated with little or no training. Also, since the present invention may provide a structure to vary the mechanical advantage provided to the operator, the operator is better able to ascend steep inclines easily.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A human powered land vehicle for carrying an operator, the operator having at least one movable arm, the vehicle comprising:
   support means for supporting the body of the operator;
   a driven wheel disposed at the rear of the vehicle;
   a steered wheel disposed at the front of the vehicle;
   two lever means comprising:
      propulsion means for translating a reciprocating motion of at least one arm of the operator into unidirectional motion of the rear driven wheel so as to propel the vehicle;
      steering means for directing the front steered wheel such that the vehicle may be guided in a left, right, or straight direction, and;
      means for locking the two lever means in parallel, and;
   frame means capable of carrying the support means, the driven wheel, the propulsion means, the steered wheel, the steering means, and the operator.

2. A human powered land vehicle as defined in claim 1 wherein the support means comprises a seat configured for the operator to sit upon.

3. A human powered land vehicle as defined in claim 2 wherein the seat comprises a bucket-shaped seat, the bucket shape configured so as to receive and securely hold the operator's lower torso in place.

4. A human powered land vehicle as defined in claim 2 further comprising a harness means, the harness means capable of holding the operator in the proper position on the seat.

5. A human powered land vehicle as defined in claim 1 wherein the propulsion means comprises:
   drivetrain means, the drivetrain means comprising means for converting the reciprocating motion of the lever means into a unidirectional rotation motion; and
   transmission means for converting the undirectional rotational motion of the drivetrain means into rotational motion of the driven wheel.

6. A human powered land vehicle as defined in claim 5 wherein each of the lever arms pivots about an axle.

7. A human powered land vehicle as defined in claim 6 wherein the two lever arms are fixed in a spaced relationship such that both lever arms are parallel to each other and move synchronously.

8. A human powered land vehicle as defined in claim 5 wherein the drivetrain means comprises:
   lever freewheel means, the lever freewheel means being fixed to the lever means and converting the reciprocating motion of the lever into unidirectional rotational motion of a lever axle;
   lever chainwheel means fixed to the lever axle so as to receive the undirectional rotational motion of the lever axle;
   driving chainwheel means;
   chain means for transmitting the unidirectional rotational motion of the lever chainwheel means to the driving chainwheel; and
   means for transmitting the rotational motion of the driving chainwheel to the driven wheel.

9. A human powered land vehicle as defined in claim 8 wherein the driving chainwheel means comprises a first and a second chainwheel and the means for transmitting comprises a first and a second sprocket attached to the driven wheel and the human powered vehicle further comprises means for changing the chain means from the first chainwheel to the second chainwheel and further comprises means for changing the chain means for the first sprocket to the second sprocket.

10. A human powered land vehicle as defined in claim 8 wherein the drivetrain means further comprises means for varying the mechanical advantage provided to the operator.

11. A human powered land vehicle as defined in claim 1 wherein the steering means comprises at least one steering handle to be grasped by the operator, the lateral movement of the steering handle directing the steered wheel.

12. A human powered land vehicle as defined in claim 1 comprising two driven wheels.

13. A human powered land vehicle as defined in claim 1 comprising a single driven wheel and a single steered wheel.

14. A human powered land vehicle as defined in claim 13 further comprising lateral support wheels for maintaining the vehicle in a substantially upright position when stationary.

15. A land vehicle for self-propulsion by a paraplegic or lower-limb amputee operator, the vehicle comprising:
   a frame;
   at least one rear driven wheel;
   a seat for supporting the operator;
   two levers locked in parallel and adapted to be grasped by the operator and to be simultaneously pushed and pulled in a reciprocating fashion both away from and toward the operator's torso;
   means for converting the reciprocating motion of the two levers into undirectional rotation motion of the rear driven wheel;
   at least one steered wheel disposed at the front of the vehicle and;
   a steering control means connected to at least one of said levers and comprising means for controlling the direction of said front steered wheel in a left, right or straight direction, whereby said levers are operable by at least one arm of said operator to drive said rear driven wheel and to steer said front steered wheel.

16. A land vehicle as defined in claim 15 wherein the means for converting the reciprocating motion comprises means for varying the ratio of the movement of the levers to the movement of the driven wheel.

17. A land vehicle as defined in claim 16 wherein the means for varying the ratio of the movement of the levers to the movement of the driven wheel comprises a plurality of cogs and a derailleur.

18. A land vehicle as defined in claim 15 comprising two steered wheels.

19. A land vehicle as defined in claim 15 comprising two driven wheels.

20. A land vehicle as defined in claim 15 wherein the positions of the seat and the levers in relation to the operator are such that the chord formed by the arc described by the grasped portion of the levers is approximately perpendicular to the operator's shoulder.

21. A land vehicle as defined in claim 15 comprising:
a single driven wheel;
a single steered wheel; and
lateral support means for maintaining the vehicle in a substantially upright position when stationary, the lateral support means comprising a plurality of rotatable wheels.

22. A land vehicle as defined in claim 15 comprising two steered wheels, the steered wheels being supported by an axle member, said axle member being pivotally connected to the frame such that the frame and axle member may pivot laterally with respect to each other.

23. A propulsion system for a human powered land vehicle propelled by at least one arm of the operator, the propulsion system comprising:
a rear driven wheel rotatably mounted to a frame;
at least one steered wheel disposed at the front of the vehicle;
two lever means disposed so as to be moved in a reciprocating motion by an arm of the operator, the lever means comprising steering means for directing the front steered wheel such that the vehicle may be guided in a left, right, or straight direction and means for locking the two lever means in parallel;
conversion means for converting the reciprocating motion of the lever means into a unidirectional rotational motion; and
transmission means for transmitting the unidirectional motion to the rear driven wheel so as to cause rotation of the driven wheel.

24. A propulsion system for a human powered land vehicle as defined in claim 23 wherein the transmission means comprises:
a driving chain connected to the conversion means; and
a sprocket fixed to the driving wheel, the sprocket engaging the driving chain.

25. A propulsion system for a human powered land vehicle as defined in claim 24 further comprising a plurality of sprockets fixed to the driven wheel and means for moving the driving chain from one sprocket to another.

26. A steering system for a human powered land vehicle as defined in claim 25 further comprising two steered wheels disposed in a laterally spaced relationship from one another at the front of the vehicle, both the steered wheels being directed by the steering handle.

27. A high performance wheelchair capable of allowing a paraplegic or lower-limb amputee operator to efficiently propel himself, the wheelchair comprising:
a frame;
a seat upon which the operator may orient his torso in a substantially non-horizontal position, the seat further comprising back support means;
two levers locked in a parallel position with respect to each other, each lever having a proximal first section and distal second section, each of the levers' proximal ends being pivotally connected to the frame and oriented such that the operator may use his arms and torso to move the distal ends of the levers toward and away from the operator's body in a reciprocating fashion;
means for converting the reciprocating motion of each lever into a unidirectional rotational motion;
at least one rear driven wheel;
means for transmitting the undirectional rotational motion to the rear driven wheel, the driven wheel contacting the ground along a portion of its circumference;
means for varying the relationship between the amount of movement of the levers and the angular velocity of the driven wheel;
at least one steered wheel disposed at the front of the wheelchair, the steered wheel being pivotally connected to the frame so as to allow the steered wheel to rotate about its hub and to laterally pivot about its axis; and
at lest one steering handle, the steering handle being mounted on at least one of the levers, and being laterally movable so as to direct the position of the front steered wheel and also being connected to the lever so as to be capable of being used to longitudinally move the lever.

* * * * *

UNITED STATES PATENT AND TRADEMARK OFFICE
CERTIFICATE OF CORRECTION

PATENT NO. : 4,705,284

DATED : November 10, 1987

INVENTOR(S) : W. Douglas Stout

It is certified that error appears in the above-identified patent and that said Letters Patent is hereby corrected as shown below:

Column 5, line 66, "can be determine" should be --can be determined--

Column 6, line 2, "may be fabrication" should be --may be fabricated--

Column 6, lines 47-48, "that those" should be --than those--

Column 11, line 19, "rrear" should be --rear--

Column 14, line 15, "that steering" should be --than steering--

Column 15, line 46, "direction, and;" should be --directed;--

Column 15, lines 47-48, "parallel, and" should be --parallel; and--

Column 16, line 66, "and;" should be --and--

Column 18, line 49, "at lest" should be --at least--

Signed and Sealed this

Twenty-first Day of June, 1988

Attest:

DONALD J. QUIGG

*Attesting Officer*  *Commissioner of Patents and Trademarks*